UNITED STATES PATENT OFFICE.

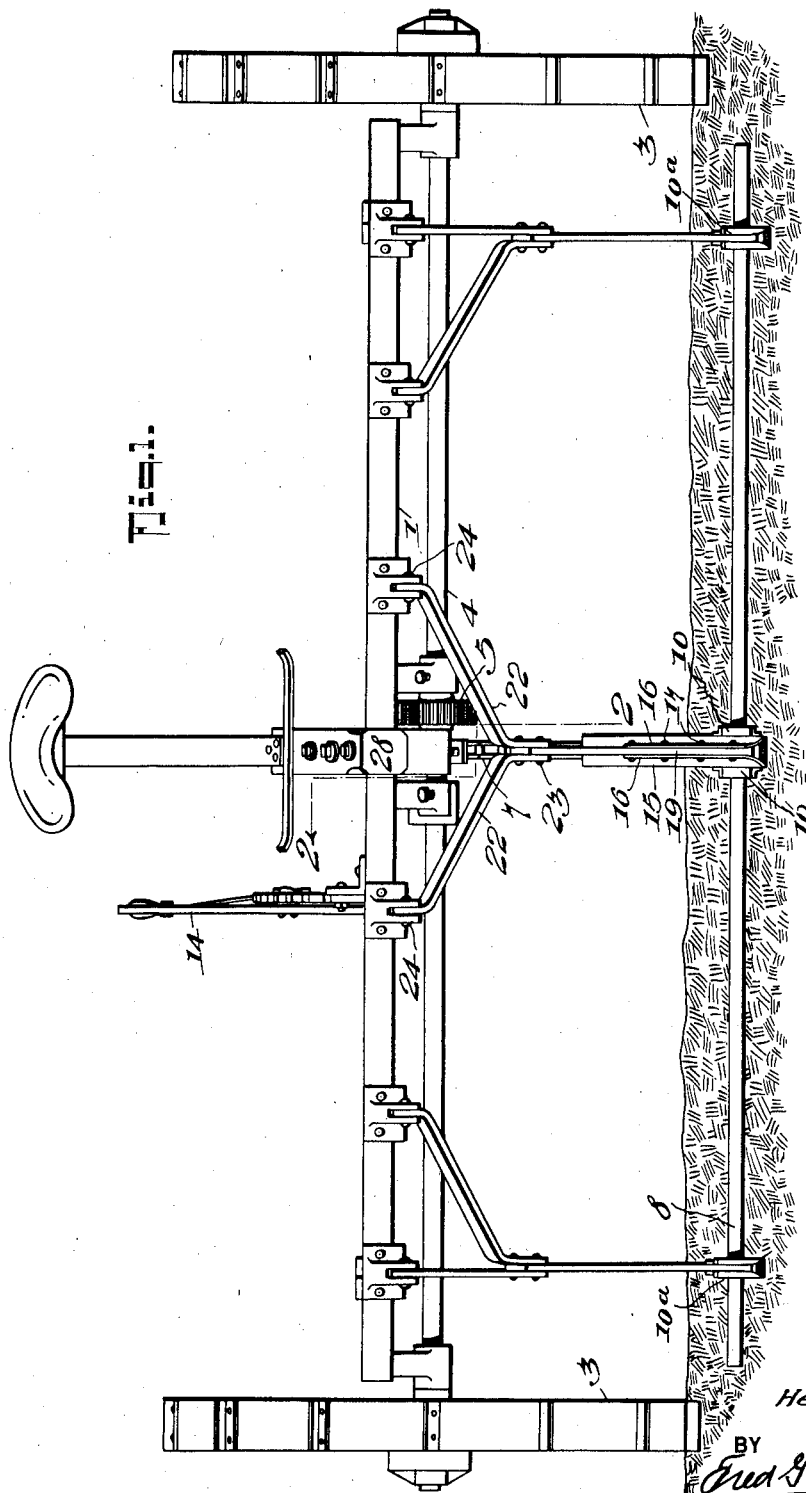

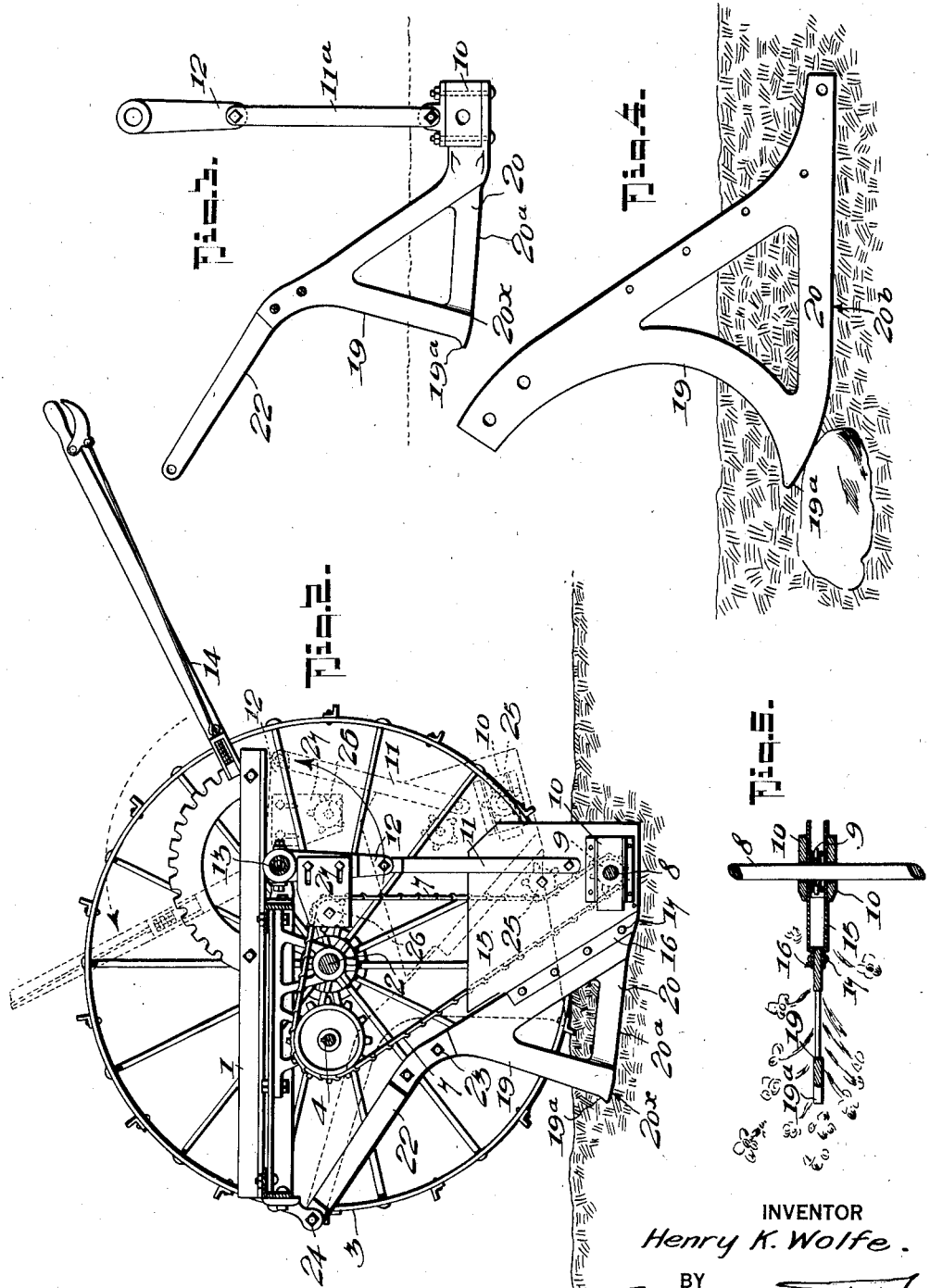

HENRY K. WOLFE, OF CHENEY, WASHINGTON, ASSIGNOR TO ROTARY ROD WEEDER AND MANUFACTURING COMPANY, INCORPORATED, OF CHENEY, WASHINGTON.

WEEDER AND CULTIVATOR.

1,338,204. Specification of Letters Patent. Patented Apr. 27, 1920.

Application filed October 25, 1919. Serial No. 333,185.

*To all whom it may concern:*

Be it known that I, HENRY K. WOLFE, a citizen of the United States, residing at Cheney, in the county of Spokane and State of Washington, have invented certain new and useful Improvements in Weeders and Cultivators, (Case E,) of which the following is a specification.

My present invention has for its object to provide an apparatus of the general type disclosed by United States Letters Patent reissued April 6, 1915, # 13,899, to the Rotary Rod Weeder and Manufacturing Company, assignee, of G. C. and H. K. Wolfe. Practice has demonstrated that in using a weeder of the general construction shown in said patent, in loose soil and particularly in tall and tangled weeds, the front members numbered 14 in the patent, which assist in pendently supporting the rotatable rod, frequently press the weed entanglement down flatwise into the soft earth, thus making it difficult for the rotary-rod to effectually perform its function and causing a retardation of the forward movement of the apparatus, frequently fouling the machine by tangled weeds catching on the hangers and links. It is, therefore, the object of the present invention to provide means which will prevent the weeds from being mashed down and will prevent them from becoming entangled with the pendent supports and braces for the rod carrying bearing blocks, etc. In order to accomplish these objects I have found, by practical experience, that by providing a weed separating shoe in advance of the rod bearings and the pendent supports and braces which sustain the rod bearings, the shoes lying in vertical planes, partly above and partly below the surface of the ground, the above noted objections to the use of the patented weeder are removed and the machine will operate satisfactorily under substantially all conditions met with in practice.

In its general nature, my present invention resides in the provision of a weed separating shoe so located in advance of the rotatable rod as to effectively separate or part the upstanding weeds (and other yieldable obstructions) both above and below the ground before they have been cut or macerated at their roots by the rotary-rod and while they are still anchored, as it were, to the ground, thereby enabling the cut weeds to readily free themselves from engagement with the upright portions of the machine and not cause a collection of trash on the machine as it is moved along over the field under working conditions.

My invention also has for its object to provide a shoe for the purposes stated of such design and contour that in effecting the separation or parting of the weeds it will exert an upward thrust or pulling effect thereon, thus imparting, as it were, somewhat of a shearing action to the tangled weeds and aiding in the separation or parting of the same.

In its subordinate nature, the invention includes those novel details of construction, combination and arrangement of parts, all of which will be first fully described, then be specifically pointed out in the appended claims and illustrated in the accompanying drawings, in which:

Figure 1 is a front elevation of a weeder and cultivator embodying my invention.

Fig. 2 is a vertical cross section of the same, on the line 2—2 of Fig. 1.

Fig. 3 is a side elevation of one of the end shoes showing the way of attaching it to the end link.

Fig. 4 is an elevation showing a modified form of separating shoe.

Fig. 5 is a diagrammatic view illustrating the action of the separating shoe in parting the weeds.

In the drawings, in which like numerals and letters indicate like parts in all of the figures, 1 represents the draft frame which is mounted on the axle shaft 2 of the traction wheels 3, the shaft 2 driving a countershaft 4 through intermeshing gears 5. The shaft 4 drives the chain 7 which passes over a sprocket 9 on the rotary-rod 8 and over idler sprockets 25—26, the latter being carried by a tension device 27 that is mounted on the rocker arm 12. 10 designates the center bearings for the rotary-rod and 10ª designates the end bearings for the same.

11 indicates the center links which connect the rocker arm 12 with the shield 15, the shield 15 carrying the bearing blocks 10 and also the shoe 20 which constitutes the essential feature of my present invention.

11ª designates the end links which connect with the end levers 12, the levers 12 being mounted on a rock shaft 13 which is actuated through an operating lever 14 in the manner similar to that employed in the patent hereinbefore referred to.

The shield 15 is secured at 16 by rivets or other suitable fastening means 17 to the shoe 19 and the front braces 22 are also secured to the shoe 19 at 23 and pivotally connected at 24 with the frame 1.

28 designates the draft tongue by means of which the apparatus is drawn over the field.

In the preferred embodiment of the invention illustrated, the shoe 19 has a prow or beak 19ª at its front which may be either vertically disposed or upwardly or rearwardly inclined as indicated in Fig. 2, or it may be curved in the shape of a goose neck, as indicated in Fig. 4. The bottom surface 20ª of the shoe may be either flat or downwardly and rearwardly inclined from the prow point 20ˣ, as shown in Fig. 2, or it may be horizontally disposed as indicated at 20ᵇ in Fig. 4.

Other modifications of the design and configuration of the shoe may be made to suit the requirements met with in practice.

I have found from practical experience by providing the apparatus with a shoe of the character stated the machine will easily ride over hidden obstructions in the ground, such as rocks, stumps or other similar impediments and thus reduce the danger of breakage to the minimum and by the use of the shoe undergrowth, tangled weeds and branches thereof are separated or parted in advance of the depending or hanging portions of the apparatus (the links 11, braces 22 and shield 15) which parts of the machine will be enabled to pass freely between the parted debris without the weeds becoming entangled therewith. Hence, as soon as the weeds are severed by the rotary-rod (at the roots of the weeds) the up-standing parts thereof will freely clear the machine and allow it to pass onward in a clean and free condition.

From the foregoing description, taken in connection with the accompanying drawings, it is thought the complete construction, operation and advantages of the invention will be readily understood by those skilled in the art to which the invention appertains.

What I claim is:

1. In a weeder and cultivator, a weeding and cultivating member of rod-like contour, mechanism for sustaining, advancing and rotating said member below the surface soil, said member being disposed substantially transversely with respect to the direction in which the member is advanced, and means for spreading the weeds apart above the surface of the ground in advance of the engagement of the weeds by the rod below the surface of the ground, to allow unobstructed passage of the mechanism which sustains said member.

2. In a weeder and cultivator, a wheeled draft frame, a transverse rotary-rod, members for sustaining said rod beneath said frame, means for raising and lowering said rod to position the same either above or below the surface of the ground, and means for parting the weeds directly in advance of the rod sustaining member.

3. In a weeder and cultivator, a wheeled draft frame, a transverse rotary-rod, members for sustaining said rod beneath said frame, means for raising and lowering said rod to position the same either above or below the surface of the ground, means for parting the weeds directly in advance of the rod sustaining member, said parting means being located so as to part the weeds before they are engaged by the rotary-rod and severed thereby.

4. In weeders and cultivators, the combination with the rotary-rod and the supporting members therefor, of a weed separating shoe located directly in front of the rotary-rod and adapted to part the weeds to allow said supporting member to pass freely by.

5. In weeders and cultivators, the combination with the rotary-rod, pendent members for sustaining said rod and a driving mechanism for the rod, of a shield for said driving mechanism and a parting shoe located directly in front of said shield.

6. In weeders and cultivators, a wheeled draft frame, a rotary-rod, means pendently supporting said rod, driving mechanism for the rod, means for raising and lowering the rod, and a separating shoe carried by said pendent supports and located directly in front of the same to spread or part the weeds and other separable obstructions encountered before they are ready for the rotary-rod.

7. In weeders and cultivators, a wheeled draft frame, a rotary-rod, means pendently supporting said rod, driving mechanism for the rod, means for raising and lowering the rod, and a separating shoe carried by said pendent supports to spread or part the weeds and other separable obstructions encountered before they are ready for the rotary-rod, said shoe comprising a body having an up-standing prow.

8. In weeders and cultivators, a wheeled draft frame, a rotary-rod, means pendently supporting said rod, driving mechanism for the rod, means for raising and lowering the rod, and a separating shoe carried by said pendent supports to spread or part the weeds and other separable obstructions encountered before they are ready for the rotary-rod, said shoe comprising a body having an upwardly and rearwardly extending prow.

9. In a weeder and cultivator, a wheeled draft frame, a transverse rotary-rod, members for sustaining said rod beneath said frame, means for raising and lowering said rod to position the same either above or below the surface of the ground, and means for parting the weeds in advance of the rod sustaining member, said parting means comprising a shoe having a concaved prow.

10. In weeders and cultivators, a wheeled draft frame, a transverse rotary-rod, members for sustaining said rod beneath said frame, means for raising and lowering said rod to position the same either above or below the surface of the ground, and a weed parting shoe located directly in advance of the rotary-rod and adapted to project above and below the surface of the ground to separate the weeds from the roots upwardly and part the same before the rotary-rod comes into action, substantially as shown and for the purposes described.

11. In a weeder and cultivator, a wheeled draft frame, a transverse rotary-rod, members for sustaining said rod beneath said frame, said members comprising levers and links pendently supporting bearing members for said rod, weed parting shoes having heels on which said bearing members are mounted and front braces connecting said shoes with said draft frame.

12. In a weeder and cultivator, a wheeled draft frame, a transverse rotary-rod, members for sustaining said rod beneath said frame, said members comprising levers and links pendently supporting bearing members for said rod, weed parting shoes having heels on which said bearing members are mounted and front braces connecting said shoes with said draft frame, said shoes each comprising a member having an upstanding prow adapted, when the machine is in operation, to project above and below the surface of the ground a distance sufficient to effect a separation of the weeds before the rotary-rod comes into action on the same.

13. In a weeder and cultivator, a wheeled draft frame, a transverse rotary-rod, members for sustaining said rod beneath said frame, said members comprising levers and links pendently supporting bearing members for said rod, weed parting shoes having heels on which said bearing members are mounted and front braces connecting said shoes with said draft frame, said shoes each comprising a member having an upstanding prow adapted, when the machine is in operation, to project above and below the surface of the ground a distance sufficient to effect a separation of the weeds before the rotary-rod comes into action on the same, said shoe having a penetrating point and having its lower surface sloped upwardly and forwardly from the heel toward the point.

HENRY K. WOLFE.